(12) United States Patent
Yoshida et al.

(10) Patent No.: US 8,272,462 B2
(45) Date of Patent: Sep. 25, 2012

(54) VEHICLE DRIVE SYSTEM

(75) Inventors: Tadafumi Yoshida, Toyota (JP); Masaki Yoshino, Toyota (JP); Yutaka Hotta, Chiryu (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 147 days.

(21) Appl. No.: 12/596,086

(22) PCT Filed: May 20, 2008

(86) PCT No.: PCT/JP2008/059616
§ 371 (c)(1),
(2), (4) Date: Oct. 15, 2009

(87) PCT Pub. No.: WO2008/146769
PCT Pub. Date: Dec. 4, 2008

(65) Prior Publication Data
US 2010/0084206 A1 Apr. 8, 2010

(30) Foreign Application Priority Data
May 25, 2007 (JP) .................. 2007-139316

(51) Int. Cl.
*B60K 1/00* (2006.01)
(52) U.S. Cl. ............ 180/65.1; 180/65.21; 361/701
(58) Field of Classification Search ........... 180/65.1, 180/65.22, 65.21; 361/701; 310/54
See application file for complete search history.

(56) References Cited

U.S. PATENT DOCUMENTS

| | | | | |
|---|---|---|---|---|
| 4,450,500 | A * | 5/1984 | Wollenschlager | 361/277 |
| 6,037,726 | A * | 3/2000 | Tabata et al. | 318/139 |
| 6,131,680 | A * | 10/2000 | Nii et al. | 180/65.235 |
| 6,166,498 | A | 12/2000 | Yamaguchi et al. | |
| 7,855,887 | B2 * | 12/2010 | Kakuda et al. | 361/699 |
| 7,932,624 | B2 * | 4/2011 | Yoshida | 307/9.1 |
| 2004/0045749 | A1 * | 3/2004 | Jaura et al. | 180/65.2 |
| 2007/0267926 | A1 * | 11/2007 | Hauenstein | 310/64 |
| 2009/0021200 | A1 * | 1/2009 | Yaguchi | 318/400.09 |
| 2009/0114462 | A1 * | 5/2009 | Tahara et al. | 180/65.21 |
| 2009/0277704 | A1 * | 11/2009 | Yamaguchi | 180/65.31 |
| 2009/0299560 | A1 * | 12/2009 | Tomatsuri et al. | 701/22 |
| 2010/0084206 | A1 * | 4/2010 | Yoshida et al. | 180/65.1 |
| 2010/0094493 | A1 * | 4/2010 | Atsumi | 701/22 |
| 2010/0116575 | A1 * | 5/2010 | Nozawa et al. | 180/65.285 |

FOREIGN PATENT DOCUMENTS

| | | |
|---|---|---|
| JP | 10-248198 A | 9/1998 |
| JP | 2000-217205 A | 8/2000 |
| JP | 2000-297641 A | 10/2000 |

(Continued)

*Primary Examiner* — J. Allen Shriver, II
*Assistant Examiner* — Emma K Frick
(74) *Attorney, Agent, or Firm* — Sughrue Mion, PLLC

(57) ABSTRACT

A vehicle drive system includes a battery, motor generators driving the vehicle using electric power from the battery or driven by the vehicle, a PCU integrated with the motor generators, having inverters and controlling the motor generator, cooling water cooling inverters, and oil cooling motor generators. The PCU includes a smoothing capacitor and a filter capacitor provided electrically closer to the battery than the smoothing capacitor. Here, the smoothing capacitor is cooled by the cooing water, while the filter capacitor is cooled by the oil.

2 Claims, 7 Drawing Sheets

FOREIGN PATENT DOCUMENTS

| | | |
|---|---|---|
| JP | 2001-119898 A | 4/2001 |
| JP | 2001-322439 A | 11/2001 |
| JP | 2002-369550 A | 12/2002 |
| JP | 2004-284447 A | 10/2004 |
| JP | 2004-343845 A | 12/2004 |
| JP | 2006-264442 A | 10/2006 |
| JP | 2006-264473 * | 10/2006 |
| JP | 2006-264473 A | 10/2006 |
| JP | 2007-129794 * | 5/2007 |
| JP | 2007-129794 A | 5/2007 |

* cited by examiner

← VEHICLE FRONT SIDE    VEHICLE REAR SIDE →

↑ VEHICLE REAR SIDE

↓ VEHICLE FRONT SIDE

VEHICLE DRIVE SYSTEM

TECHNICAL FIELD

The present invention relates to a vehicle drive system and, more specifically, to a vehicle drive system in which a rotating electric machine and an electric device controlling an operation of the rotating electric machine are integrated.

BACKGROUND ART

A vehicle driver having a structure in which a rotating electric machine and an electric device electrically connected to the rotating electric machine are integrated has been conventionally known.

By way of example, Japanese Patent Laying-Open No. 2001-119898 (Patent Document 1) describes a driver for a vehicle in which an inverter case is integrated with a driver case to improve mountability onto the vehicle.

Similarly, Japanese Patent Laying-Open Nos. 2001-322439 (Patent Document 2), 10-248198 (Patent Document 3) and 2004-343845 (Patent Document 4) disclose vehicle drivers in which a motor as the rotating electric machine is integrated with an inverter as the electric device.

Assume that a plurality of capacitors are provided for the electric device controlling the rotating electric machine, and state of heat generation differs capacitor by capacitor. In such a case, optimization of a system for cooling these capacitors is desired. From a viewpoint different from above, it is desired to optimize wires connected to the plurality of capacitors and to make shorter the wiring length, in order to improve mountability of the driving system onto the vehicle.

Patent Documents 1 to 4, however, do not specifically disclose the cooling system or the electric connection structure for the plurality of capacitors and, therefore, the demand above cannot fully be satisfied.

DISCLOSURE OF THE INVENTION

An object of the present invention is to provide a vehicle drive system in which a system for cooling a plurality of capacitors is optimized. Another object of the present invention is to provide a vehicle drive system in which wires connected to the plurality of capacitors are made shorter to improve mountability.

According to an aspect, the present invention provides a vehicle drive system, including: a power source; a rotating electric machine driving a vehicle using electric power from the power source or driven by the vehicle; an electric device integrated with the rotating electric machine, having an inverter and controlling the rotating electric machine; a first cooling medium cooling the inverter; and a second cooling medium cooling the rotating electric machine; wherein the electric device includes a first capacitor and a second capacitor provided electrically closer to the power source than the first capacitor; and one of the first and second capacitors is cooled by the first cooling medium, and the other of the first and second capacitors is cooled by the second cooling medium.

According to the structure described above, the first and second capacitors are cooled by different cooling media. Therefore, even when the state of heat generation differs in the first and second capacitors, for example, even when one of the first and second capacitors generates significantly larger amount of heat, the influence on the system as a whole can be reduced.

According to an aspect, the vehicle drive system described above further includes a cooler mounted on the inverter, and the first cooling medium includes cooling medium that flows in the cooler.

According to another aspect, the vehicle drive system described above further includes a housing containing the rotating electric machine, and the second cooling medium includes oil stored in the housing.

According to a further aspect, the vehicle drive system described above further includes a cooler mounted on the inverter, and a housing containing the rotating electric machine. The first cooling medium includes cooling medium that flows in the cooler; the second cooling medium includes oil stored in the housing; the first capacitor has larger capacity than the second capacitor; the first capacitor is cooled by the first cooling medium; and the second capacitor is cooled by the second cooling medium.

As an example, in the vehicle drive system described above, the electric device has a converter for boosting or lowering DC voltage; the first capacitor is electrically connected in parallel with the inverter; and the second capacitor is provided electrically between the power source and the converter.

According to a further aspect, the present invention provides a vehicle drive system, including: a power source; a rotating electric machine driving a vehicle using electric power from the power source or driven by the vehicle; an electric device integrated with the rotating electric machine, and controlling the rotating electric machine; wherein the electric machine includes a first capacitor and a second capacitor provided electrically closer to the power source than the first capacitor; the rotating electric machine is provided in an engine room positioned on a front side of the vehicle; the power source is provided on a more rear side of the vehicle than the rotating electric machine; and the second capacitor is provided on the more rear side of the vehicle than the first capacitor.

By the structure describe above, the second capacitor positioned electrically closer to the power source than the first capacitor is provided the more rear side of the vehicle than the first capacitor, so that the wire connecting the power source to the second capacitor can be made shorter. Therefore, mountability of the drive system onto the vehicle can be improved.

According to one aspect, the present invention enables optimization of a system for cooling a plurality of capacitors in the vehicle drive system. According to another aspect, in the vehicle drive system, the wires connected to the plurality of capacitors can be made shorter and thereby mountability can be improved.

Two or more of the above-described structures may appropriately be combined.

BEST MODES FOR CARRYING OUT THE INVENTION

Figure 1:
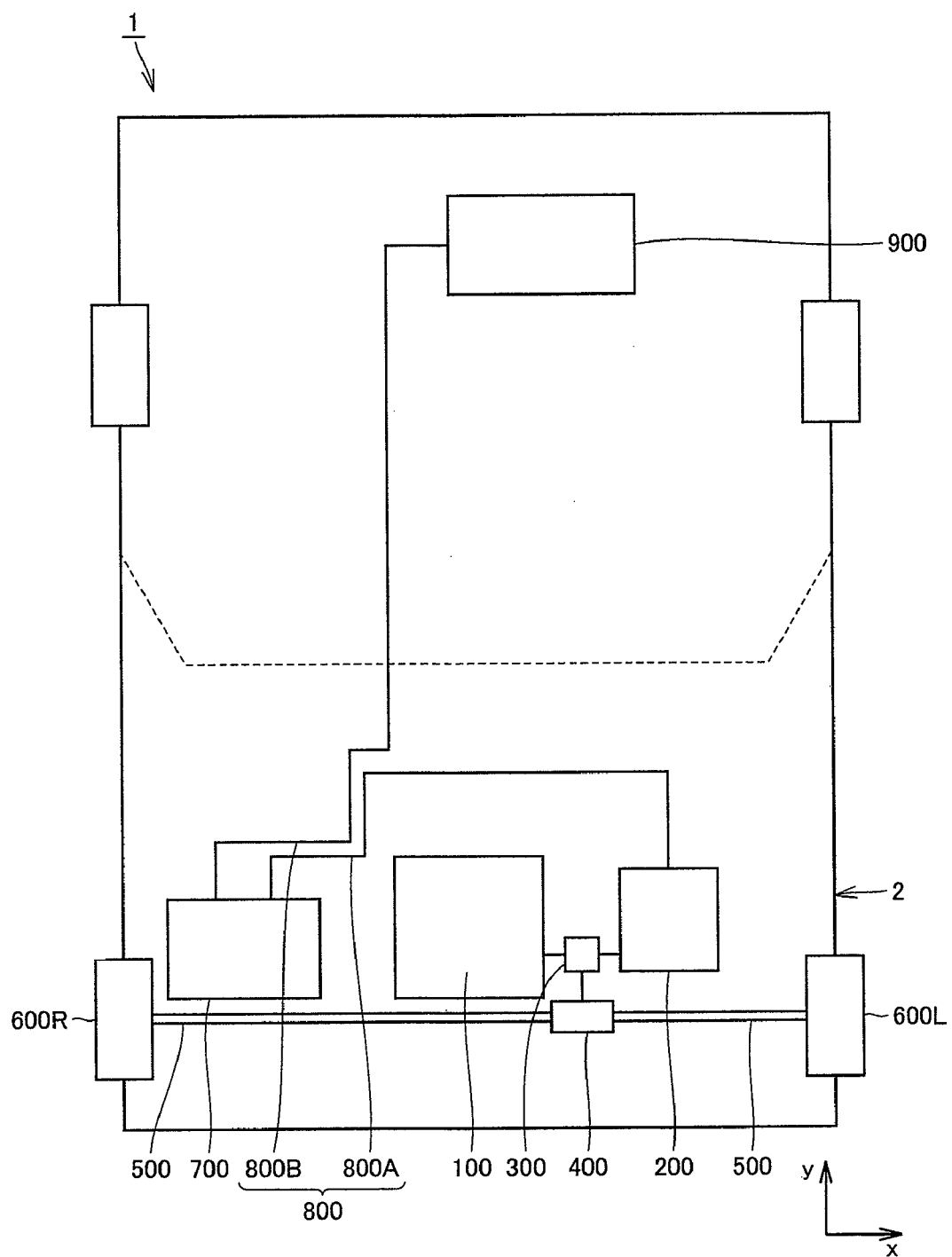
FIG. 1 is a schematic diagram showing a structure of a hybrid vehicle to which the vehicle drive system in accordance with an embodiment of the present invention is applied.

In the following, embodiments of the present invention will be described. The same or corresponding portions are denoted by the same reference characters and description thereof may not be repeated.

In the embodiments described in the following, descriptions of numbers, amounts and the like are not intended to limit the scope of the invention unless otherwise specified. Further, in the embodiments below, each component is not always necessary, unless otherwise specified. When a plurality of embodiments are possible, it is naturally expected that structures of various embodiments are appropriately combined, unless otherwise specified.

FIG. 1 is a schematic diagram showing a structure of a hybrid vehicle having the vehicle drive system in accordance with an embodiment of the present invention.

Referring to FIG. 1, a hybrid vehicle 1 includes an engine 100, a motor generator 200, a power split device 300, a differential mechanism 400, a drive shaft 500, driving wheels 600L and 600R as front wheels, a PCU (Power Control Unit) 700, a cable 800, and a battery 900.

As shown in FIG. 1, engine 100, motor generator 200, power split device 300 and PCU 700 are arranged in an engine room 2. Motor generator 200 and PCU 700 are connected by a cable 800A. PCU 700 and battery 900 are connected by a cable 800B. Further, a power output device formed of engine 100 and motor generator 200 is coupled to differential mechanism 400 through power split device 300 and a reduction mechanism. Differential mechanism 400 is coupled to driving wheels 600L and 600R through drive shaft 500.

Motor generator 200 is a three-phase AC synchronous motor generator, which generates driving force from the AC electric power received from PCU 700. Further, motor generator 200 is also used as a generator when, for example, speed of hybrid vehicle 1 is reduced, generates AC power by the power generating function (regenerative power), and outputs the generated AC power to PCU 700. Power split device 300 includes a planetary gear, as will be described later.

PCU 700 controls driving of motor generator 200 by converting a DC voltage received from battery 900 to an AC voltage. Further, PCU 700 converts an AC voltage generated by motor generator 200 to a DC voltage and thereby charges battery 900.

Figure 2:
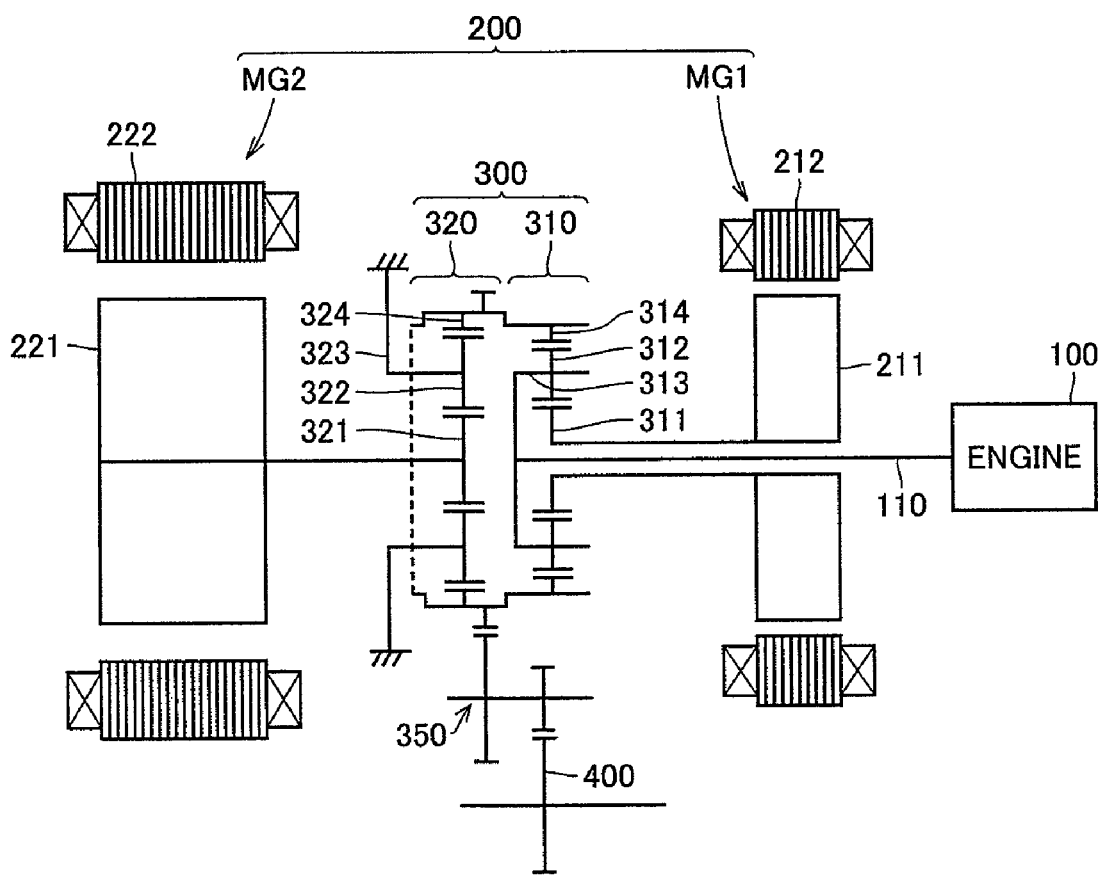
FIG. 2 is an illustration showing details of a motor generator and a power split device shown in FIG. 1.

FIG. 2 is an illustration showing details of a motor generator 200 and a power split device 300 shown in FIG. 1.

Referring to FIG. 2, motor generator 200 is formed to include motor generators MG1 and MG2. Motor generators MG1 and MG2 are formed to include rotors 211 and 221 and stators 212 and 222, respectively.

Further, power split mechanism 300 is formed to include planetary gears 310 and 320. Planetary gears 310 and 320 are formed to include sun gears 311 and 321, pinion gears 312 and 322, planetary carriers 313 and 323, and ring gears 314 and 324, respectively.

A crankshaft 110 of engine 100 and rotors 211 and 221 of motor generators MG1 and MG2 rotate about the same axis.

Sun gear 311 of planetary gear 310 is coupled to a hollow sun gear shaft, through the center of which the crankshaft 110 passes. Ring gear 314 is rotatably supported, coaxially with crankshaft 110. Pinion gear 312 is positioned between sun gear 311 and ring gear 314, and it revolves on an outer circumference of sun gear 311 while it rotates. Planetary carrier 313 is coupled to an end of crankshaft 110, and supports rotation shaft of each pinion gear 312.

A counter drive gear for taking out power from power split device 300 rotates integrally with ring gear 314. The counter drive gear is connected to a counter gear 350. Power is transmitted to/from counter drive gear and counter gear 350. Counter gear 350 drives differential mechanism 400. On a downhill, for example, rotations of wheels are transmitted to differential mechanism 400, and counter gear 350 is driven by differential mechanism 400.

Motor generator MG1 mainly operates as a generator that generates electro motive force across opposite ends of three-phase coil by the interaction of rotation of rotor 211 and magnetic field of permanent magnets.

Rotor 221 of motor generator MG2 is coupled to a ring gear case that rotates integrally with ring gear 314 of planetary gear 310, through planetary gear 320 as a reduction gear.

Motor generator MG2 operates as an electric motor that rotates and drives rotor 221 by the interaction between the magnetic field generated by permanent magnets embedded in rotor 221 and the magnetic field formed by the three-phase coil wound around stator 222. Further, motor generator MG2 also operates as a generator that generates electromotive force across opposite ends of three-phase coil by the interaction between the magnetic field generated by permanent magnets and the rotation of rotor 221.

Planetary gear 320 realizes speed reduction by the structure in which planetary carrier 323 as one of the rotating elements is fixed on a case of the vehicle driver. Specifically, planetary gear 320 includes a sun gear 321 coupled to the shaft of rotor 221, a ring gear 324 that rotates integrally with ring gear 314, and a pinion gear 322 that meshes with ring gear 324 and sun gear 321 and transmits rotation of sun gear 321 to ring gear 324.

Figure 3:
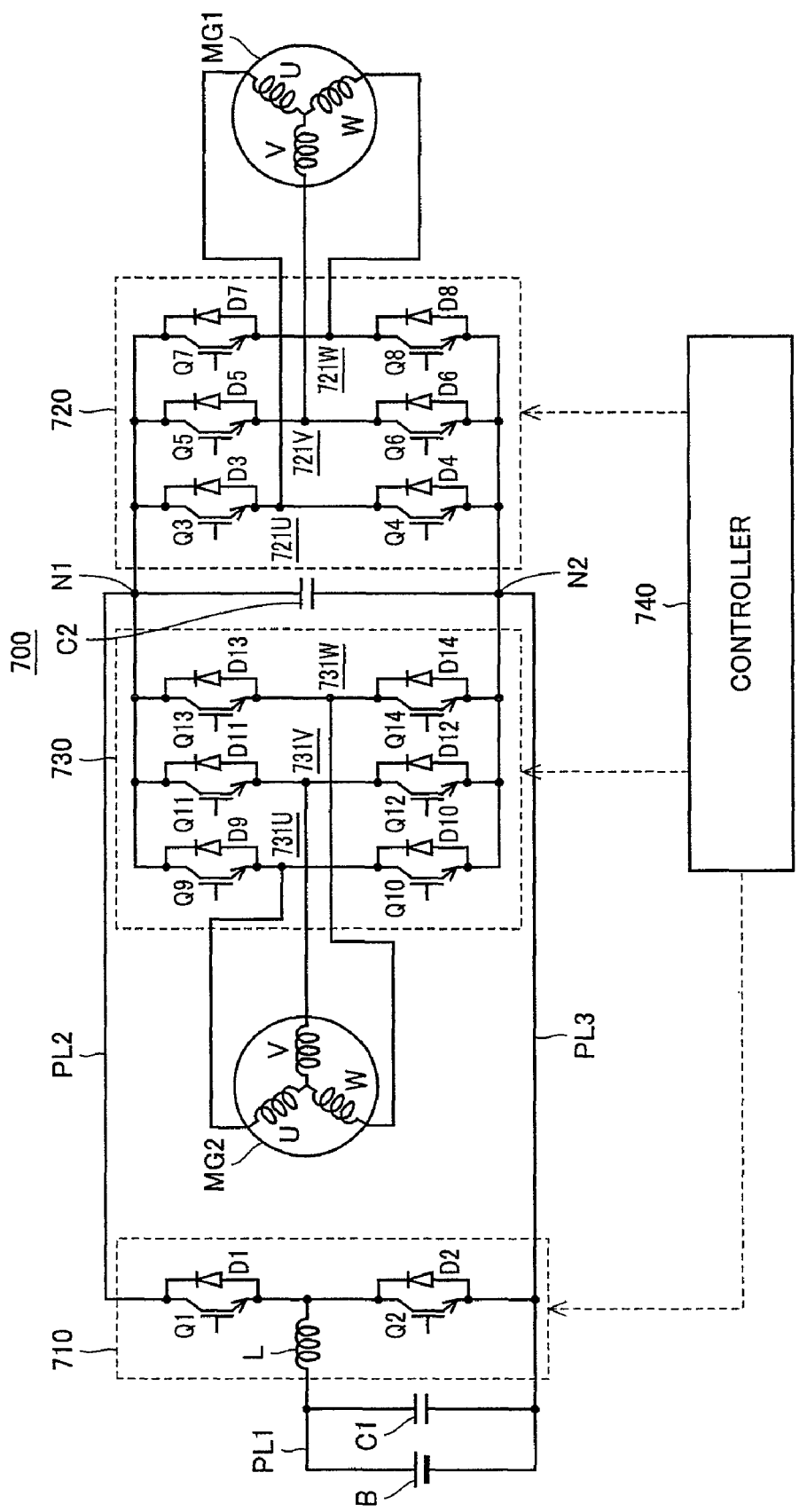
FIG. 3 is a circuit diagram showing a structure of a main portion of PCU shown in FIG. 1.

FIG. 3 is a circuit diagram showing a structure of a main portion of PCU 700. Referring to FIG. 3, PCU 700 is formed to include a converter 710, inverters 720 and 730, a controller 740, a filter capacitor C1, and a smoothing capacitor C2. Converter 710 is connected between battery B and inverters 720 and 730, and inverters 720 and 730 are connected to motor generators MG1 and MG2, respectively.

Converter 710 includes power transistors Q1 and Q2, diodes D1 and D2, and a reactor L. Power transistors Q1 and Q2 are connected in series, and each at its base, receive a control signal from controller 740. Diodes D1 and D2 are connected between collector and emitter of power transistors Q1 and Q2, respectively, to cause current flow from emitter side to collector side of power transistors Q1 and Q2, respectively. Reactor L has one end connected to a power line PL1 connected to a positive electrode of battery B, and the other end connected to a node between power transistors Q1 and Q2.

Converter 710 boosts DC voltage received from battery B using reactor L, and supplies the boosted voltage to a power line PL2. Further, converter 710 lowers the DC voltage received from inverter 720, 730, and with this voltage, charges battery B.

Inverters 720 and 730 include U-phase arms 721U and 731U, V-phase arms 721V and 731V, and W-phase arms 721W and 731W, respectively. U-phase arm 721U, V-phase arm 721V and W-phase arm 721W are connected in parallel between nodes N1 and N2. Similarly, U-phase arm 731U, V-phase arm 731V and W-phase arm 731W are connected in parallel between nodes N1 and N2.

U-phase arm 721U includes series-connected two power transistors Q3 and Q4. Similarly, U-phase arm 731U, V-phase arms 721V and 731V and W-phase arms 721W and 731W include series-connected two power transistors Q5 to Q14, respectively. Between collector and emitter of each of the power transistors Q3 to Q14, diodes D3 to D14, causing current flow from emitter side to collector side, are connected, respectively.

A middle point of the arm of each phase in inverters 720 and 730 is connected to an end of each phase of coils of respective phases in motor generators MG1 and MG2. Motor generators MG1 and MG2 are formed by three coils of U, V and W phases, each having one end connected commonly to a mid point.

Filter capacitor C1 is connected between power lines PL1 and PL3, and smoothes voltage level of power line PL1. Further, smoothing capacitor C2 is connected between power lines PL2 and PL3, and smoothes voltage level of power line PL2.

Inverters 720 and 730 convert a DC voltage from capacitor C2 to an AC voltage based on a drive signal from controller 740, and thereby drive motor generators MG1 and MG2.

Controller 740 calculates coil voltages of respective phases of motor generators MG1 and MG2, based on a motor torque command value, phase current values of motor generators MG1 and MG2, and input voltages of inverters 720 and 730, and based on the result of calculation, generates and outputs to inverters 720 and 730 a PWM (Pulse Width Modulation) signal for turning on/off power transistors Q3 to Q14.

Further, controller 740 calculates duty ratio of power transistors Q1 and Q2 for optimizing input voltages to inverters 720 and 730 based on the motor torque command value and motor rotation number mentioned above, and based on the result of calculation, generates and outputs to converter 710 a PWM signal for turning on/off power transistors Q1 and Q2.

Further, controller 740 controls switching operations of power transistors Q1 to Q4 of converter 710 and inverters 720 and 730, in order to convert the AC power generated by motor generators MG1 and MG2 to DC power and thereby to charge battery B.

When PCU 700 operates, power transistors Q1 to Q14 and diodes D1 to D14 forming converter 710 and inverters 720 and 730 generate heat. Therefore, it is necessary to provide a cooling mechanism for promoting cooling of these semiconductor elements.

Figure 4:
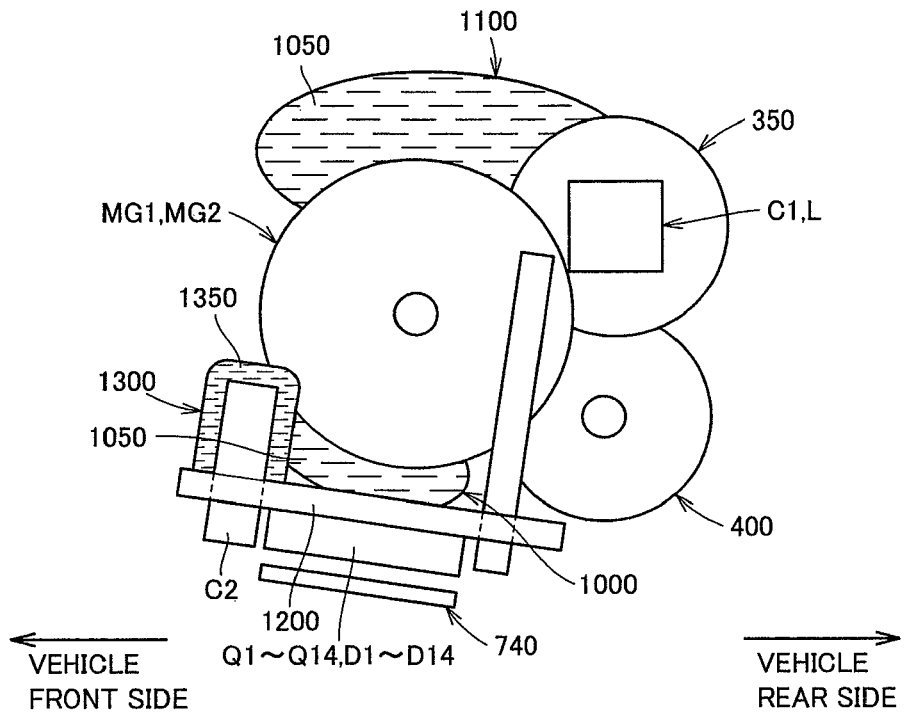
FIG. 4 is a side view schematically showing a drive unit included in the vehicle drive system in accordance with an embodiment of the present invention.
Figure 5:
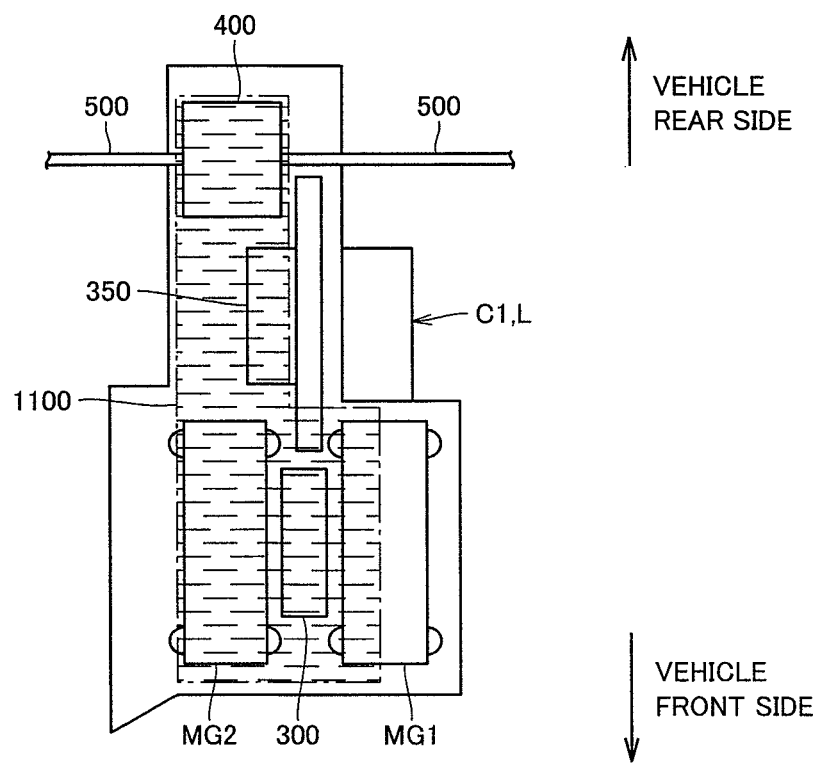
FIG. 5 is a top view schematically showing the drive unit of FIG. 4.

Next, referring to FIGS. 4 and 5, the vehicle drive system in accordance with the present embodiment will be described. FIGS. 4 and 5 are side view and top view schematically showing the drive unit included in the drive system in accordance with the present embodiment.

As shown in FIGS. 4 and 5, the drive unit includes motor generators MG1 and MG2, a counter gear 350, and a differential mechanism 400 coupled to a drive shaft 500. At a bottom portion of a housing containing motor generators MG1 and MG2, an oil reservoir 1000 is formed, and oil 1050 is stored in oil reservoir 1000. On an upper side of the drive unit, a catch tank 1100 is formed. Oil 1050 stored in oil reservoir 1000 is taken up toward catch tank 1100 as the drive unit operates. The oil stored in catch tank 1100 is supplied to various portions of the drive unit, and used for lubrication and cooling.

Filter capacitor C1 and reactor L are provided on a side of counter gear 350. As shown in FIGS. 2 and 5, the drive unit has such a structure that includes power split mechanism 300 provided between two motor generators MG1 and MG2 arranged side by side in the axial direction and a counter gear 350 provided to receive power transmitted from power split mechanism 300. Therefore, there tends to be a margin space on the side of counter gear 350, which space corresponds to the axial length of motor generators MG1 and MG2. In the present embodiment, filter capacitor C1 and reactor L are arranged in this margin space. Filter capacitor C1 and reactor L are cooled by oil 1050 stored in catch tank 1100.

On the lower side of drive unit, a cooling plate 1200 is attached. On cooling plate 1200, an IPM (Intelligent Power Module) including power transistors Q1 to Q14 and diodes D1 and D14, and controller 740 (control board) are mounted. In cooling plate 1200, cooling water supplied from a radiator flows, whereby IPM is cooled. Cooling water 1350 that passed through cooling plate 1200 flows into a cooling water channel formed on an outer periphery of smoothing capacitor C2 positioned closer to the vehicle front side than the drive unit. Smoothing capacitor C2 is cooled thereby. Specifically, in the present embodiment, filter capacitor C1 and smoothing capacitor C2 are cooled by different cooling media.

As in the example shown in FIGS. 4 and 5, when a structure having motor generators MG1 and MG2 and PCU 700 integrated together is used, by providing IPM including power transistors Q1 to Q14 and diodes D1 to D14 and controller 740 below motor generators MG1 and MG2, ease of maintenance of PCU 700 can be improved. Further, it is often the case that a support structure of the drive unit supports the drive unit from above or from a side of the unit and, therefore, a margin space tends to result below motor generators MG1 and MG2. In the example shown in FIGS. 4 and 5, IPM is mounted in this margin space.

In the vehicle drive system in accordance with the present embodiment, filter capacitor C1 and smoothing capacitor C2 are cooled by different cooling medium and, therefore, even if one of the filter capacitor C1 and smoothing capacitor C2 generates significantly larger amount of heat, the influence on the whole system can be alleviated.

Further, in the present embodiment, filter capacitor C1 is arranged on the more rear side of the vehicle than smoothing capacitor C2. By such an arrangement, it becomes possible to make shorter the wire connecting battery 900 and filter capacitor C1 that is positioned electrically closer to battery 900 than smoothing capacitor C2 and, therefore, it becomes easier to mount the drive system on the vehicle.

Figure 6:
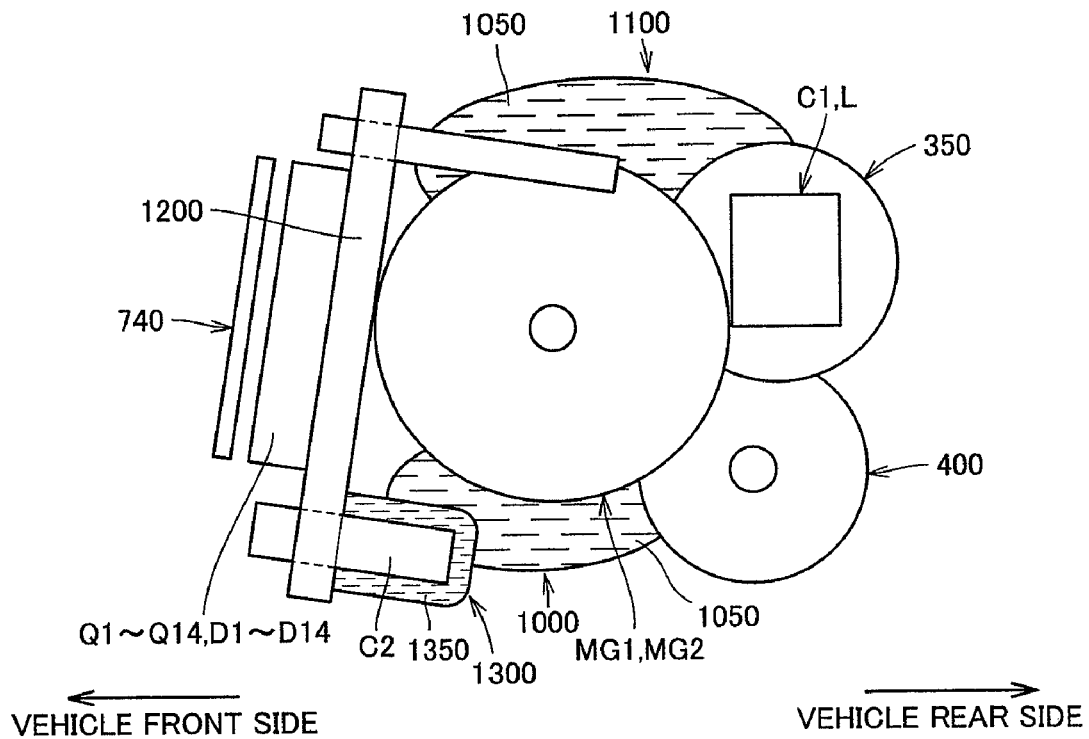
FIG. 6 is a side view schematically showing a modification of the drive unit included in the vehicle drive system in accordance with an embodiment of the present invention.

FIG. 6 is a side view schematically showing a modification of drive unit included in the vehicle drive system in accordance with the present embodiment. Referring to FIG. 6, the drive unit in accordance with the present embodiment is characterized in that the IPM including power transistors Q1 to Q14 and diodes D1 to D14 and controller 740 are arranged on the front side of the vehicle.

Assume that engine 100 and the drive unit including motor generators MG1 and MG2 are arranged side by side in the widthwise direction of the vehicle. As the engine 100 is larger than the drive unit, there tends to be a margin space relatively on the front side of the drive unit, when a space between engine 100 and a radiator positioned on the front side of the vehicle is to be ensured. In the example of FIG. 6, IPM is mounted in this margin space.

As in the example shown in FIGS. 4 and 5, in the example of FIG. 6, filter capacitor C1 and reactor L are arranged on the side of counter gear 350. Further, in water jacket 1300 for cooling smoothing capacitor C2, cooling water in cooling plate 1200 is guided, as in the example shown in FIGS. 4 and 5.

Next, referring to FIGS. 7 to 10, result of comparison of various mounting structures of inverters 720 and 730 integrated with motor generators MG1 and MG2 will be described.

Figure 7:
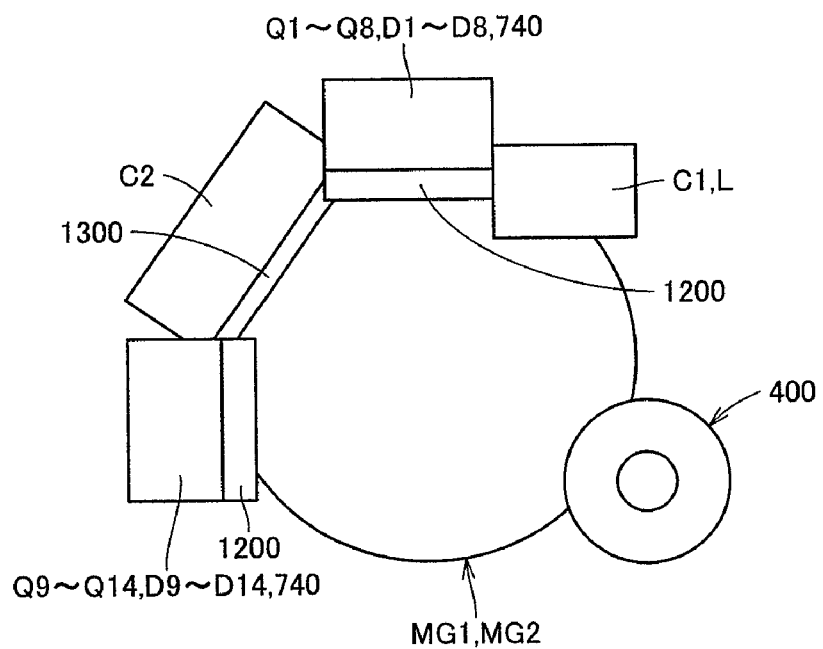
FIG. 7 is a (first) illustration showing a structure for mounting an electric device to be integrated with the rotating electric machine.
Figure 8:
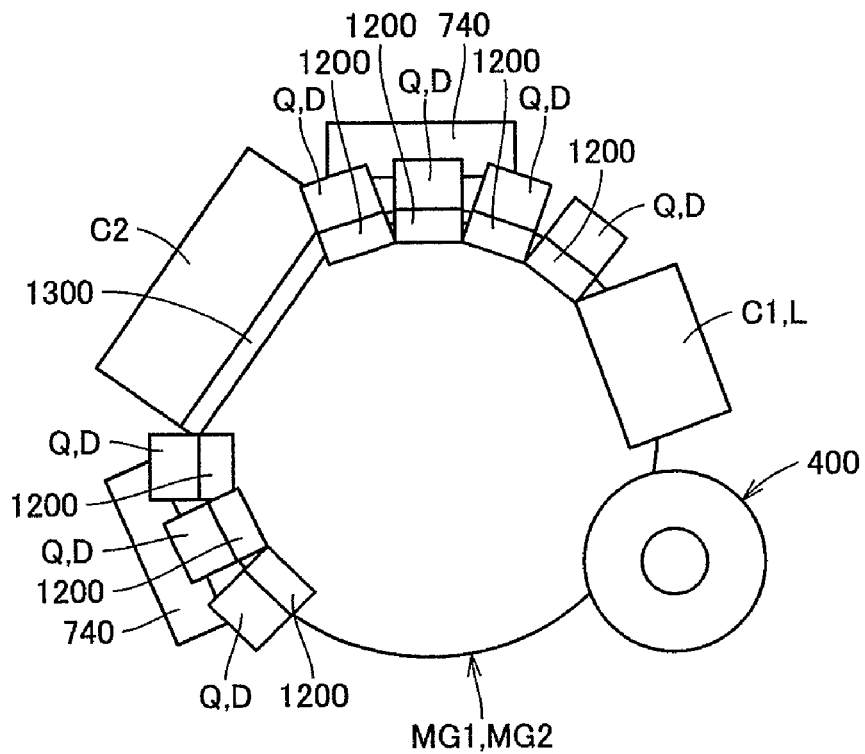
FIG. 8 is a (second) illustration showing a structure for mounting an electric device to be integrated with the rotating electric machine.

FIGS. 7 and 8 show examples in which IPM including power transistors Q1 to Q14 and diodes D1 to D14 is divided for mounting. In the example shown in FIG. 7, IPM is mounted, divided into an IPM including transistors Q1 to Q8 and diodes D1 to D8 and an IPM including transistors Q9 to Q14 and diodes D9 to D14. In the example shown in FIG. 8, the IPM is divided into larger number of modules and mounted. By dividing the IPM as in the examples of FIGS. 7 and 8, the space for rpm can more easily be secured. On the other hand, however, structure of cooling water channel and bus bar structure around the divided IPM as well as the structure of water proof cover for inverters in the outer periphery of motor generators MG1 and MG2 become complicated. As a result, for the examples shown in FIGS. 7 and 8, the cost of manufacturing integrated motor-inverter structure increases.

Figure 9:
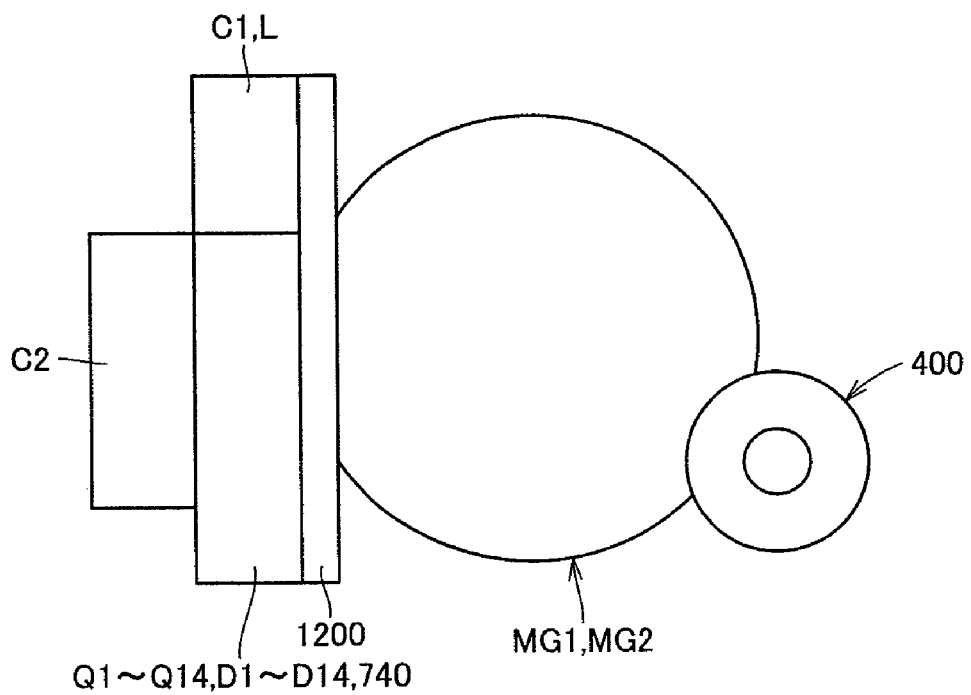
FIG. 9 is a (third) illustration showing a structure for mounting an electric device to be integrated with the rotating electric machine.

FIG. 9 shows an example in which IPM including power transistors Q1 to Q14 and diodes D1 to D14, filter capacitor C1 and reactor L, and smoothing capacitor C2 are all mounted on one cooling plate 1200. In the example shown in FIG. 9, the structure of cooling water channel, bus bar structure and water proof cover for the inverters can be simplified, and manufacturing cost for the integrated motor-inverter structure can be reduced. On the other hand, as all elements forming inverters 720 and 730 are mounted on one cooling plate 120, these elements are provided concentrated at one portion on the outer periphery of the drive unit, reducing margin in the mounting space.

Figure 10:
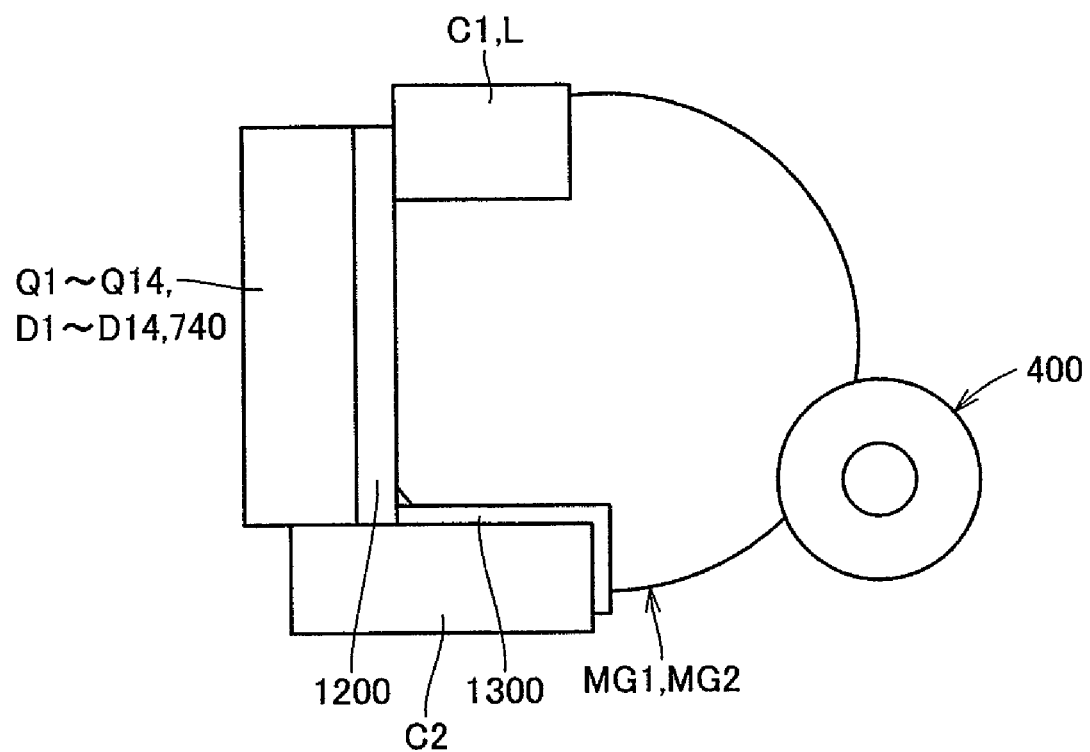
FIG. 10 is a (fourth) illustration showing a structure for mounting an electric device to be integrated with the rotating electric machine.

FIG. 10 shows an example in which inverter 720 is mounted divided into filter capacitor C1 and reactor L, IPM including power transistors Q1 to Q14 and diodes D1 to D14, and smoothing capacitor C2, similar to examples shown in FIGS. 4 to 6. By the example of FIG. 10, it is possible to reduce the size of drive unit while ensuring relatively wide margin space in the mounting space, while preventing excessive increase in manufacturing cost for the integrated motor-inverter structure.

The contents described above will be summarized. The vehicle drive system in accordance with the present embodiment includes battery 900 as the "power source," motor generators MG1 and MG2 as "rotating electric machines" driving the vehicle using electric power from battery 900 or driven by the vehicle, PCU 700 as the "electric device" integrated with motor generators MG1 and MG2, having inverters 720 and 730 and controlling motor generator MG2, cooling water 1350 as the "first cooling medium" cooling inverters 720 and 730, and oil 1050 as the "second cooling medium" cooling motor generators MG1 and MG2. PCU 700 includes smoothing capacitor C2 as the "first capacitor" and filter capacitor C1 as the "second capacitor" provided electrically closer to battery 900 than the smoothing capacitor C2. Here, smoothing capacitor C2 is cooled by cooing water 1350, while filter capacitor C1 is cooled by oil 1050.

The vehicle drive system described above includes cooling plate 1200 as the "cooler" attached to PCU 700. Cooling water 1350 is cooling medium flowing through cooling plate 1200. Further, oil 1050 is stored in oil reservoir 1000 formed in a housing containing motor generators MG1 and MG2.

Further, in the drive system in accordance with the present embodiment, motor generators MG1 and MG2 are provided in engine room 2 positioned at the front side of the vehicle. On the other hand, battery 900 is provided the more rear side of vehicle than motor generators MG1 and MG2. Filter capacitor C1 arranged on the side electrically closer to battery 900 is arranged on the more rear side of the vehicle than capacitor C2.

More specifically, in the vehicle drive system in accordance with the present embodiment, PCU 700 has converter 710 for boosting or lowering DC voltage and inverters 720 and 730 for converting DC voltage to/from AC voltage, smoothing capacitor C2 is electrically connected in parallel with inverters 720 and 730, and filter capacitor C1 is provided electrically between battery 900 and converter 710.

Although the present invention has been described and illustrated in detail, it is clearly understood that the same is by way of illustration and example only and is not to be taken by way of limitation, the scope of the present invention being interpreted by the terms of the appended claims.

Industrial Applicability

The present invention is applicable, for example, to a vehicle drive system in which a rotating electric machine and an electric device controlling the operation of rotating electric machine are integrated.

The invention claimed is:

1. A vehicle drive system, comprising:
    a power source;
    a rotating electric machine driving a vehicle using electric power from said power source or driven by the vehicle;
    an electric device integrated with said rotating electric machine, having an inverter and controlling the rotating electric machine;
    a first cooling medium cooling said inverter;
    a second cooling medium cooling said rotating electric machine;
    a cooler mounted on said inverter; and
    a housing containing said rotating electric machine,
    wherein said electric device includes a first capacitor and a second capacitor; one of said first and second capacitors is cooled by said first cooling medium, and the other of said first and second capacitors is cooled by said second cooling medium,
    wherein said electric device has a converter for boosting or lowering DC voltage; said first capacitor is electrically connected in parallel with said inverter; and said second capacitor is provided electrically between said power source and said converter, and
    wherein said first cooling medium includes cooling medium that flows in said cooler; said second cooling medium includes oil stored in said housing; said first capacitor has larger capacity than said second capacitor.

2. The vehicle drive system according to claim 1,
    wherein said rotating electric machine is provided in an engine room positioned on a front side of the vehicle;
    said power source is provided on a more rear side of the vehicle than said rotating electric machine; and
    said second capacitor is provided on the more rear side of the vehicle than said first capacitor.

* * * * *